United States Patent [19]

Shim

[11] 3,873,507

[45] Mar. 25, 1975

[54] PROCESS OF MANUFACTURING SULFUR-NITROGEN POLYMERS

[75] Inventor: Kyung S. Shim, Irvington, N.Y.

[73] Assignee: Stauffer Chemical Company, New York, N.Y.

[22] Filed: Oct. 8, 1970

[21] Appl. No.: 79,269

Related U.S. Application Data

[63] Continuation-in-part of Ser. No. 839,084, July 3, 1969, abandoned, which is a continuation-in-part of Ser. No. 732,840, May 29, 1968, abandoned.

[52] U.S. Cl. ................ 260/79, 260/5, 260/23.7 M, 260/583 EE
[51] Int. Cl. ............................................ C08g 23/00
[58] Field of Search ........................ 260/79, 583 EE

[56] References Cited
UNITED STATES PATENTS 3,040,098   6/1962   Stone .................................. 260/583

OTHER PUBLICATIONS

Condensed Chemical Dictionary, 5th Edition, pg. 443–444, Reinhold Publishing Co., N.Y. (1956).

Journal of the American Chemical Society, Vol. 81, (1959), pgs. 3580 to 3584.

Primary Examiner—Melvyn I. Marquis

[57]  ABSTRACT

A process for producing a polymeric material containing sulfur and nitrogen that consists of adding ethylamine to a polar solvent. Then at least a stoichiometric amount of sulfur dichloride is added to the aklylamine polar solvent mixture at a temperature of between $-100°$ C. to about $80°$ C.

5 Claims, No Drawings

PROCESS OF MANUFACTURING SULFUR-NITROGEN POLYMERS

REFERENCE TO RELATED APPLICATION

This application is a continuation-in-part of application Ser. No. 839,084, filed July 3, 1969 which is a continuation-in-part of application Ser. No. 732,840, filed May 29, 1968 for "Process of Manufacturing Sulfur-Nitrogen Polymers and both now abandoned."

BACKGROUND OF THE INVENTION

In the art of manufacturing sulfur-nitrogen polymers by reacting sulfur dichloride and alkylamines as taught in U.S. Pat. No. 3,040,098 and the *Journal of the American Chemical Society*, Vol. 81, pp. 3,580–84 (1959), it is the practice to conduct the reaction without a solvent or to dissolve sulfur dichloride in an inert solvent such as hexane which remains liquid at the reaction temperature. The reactant is then cooled and a slow stream of gaseous monomethylamine is added to the cooled reactants at atmospheric pressure. The reaction between the sulfur dichloride and monomethylamine forms a polymer having a molecular weight corresponding to about 6 or more nitrogen atoms disposed in a linear chain. Higher molecular weight polymers can be formed by reacting equimolar portions of sulfur dichloride and monomethylamine. Since this reaction evolves hydrogen chloride, it is necessary to have a hydrogen chloride acceptor or scavenger present in order to combine with the hydrogen chloride to allow the reaction to continue with the production of the polymers. These are in the form of tertiary amines such as pyridine, triethylamine and other strongly basic tertiary amines. An excess of monomethylamine can be employed as a hydrogen chloride acceptor.

The polymer formed in this manner is soluble in chloroform or other solvents and is a putty-like brown material that is reported to be suitable for drawing into filaments in the production of fibers.

The references also Journal that it is essential to use monomethylamine as the source of nitrogen in this reaction because the reaction product of sulfur dichloride and ethylamine produces a cyclic tetramer which decomposes spontaneously at room temperatures. The reaction product of sulfur dichloride and monomethylamine is reported in the prior art (*Journal of the American Chemical Society*, Vol. 81, p. 3581 (1959)) to be relatively unstable. It is reported that it decomposes on standing a few weeks at room temperature and decomposes violently at 80° – 100° C.

The prior art also discloses that the polymer formed by the reaction of sulfur dichloride and monomethylamine is soluble in solvents such as chloroform.

BRIEF DESCRIPTION OF THE INVENTION

It has been discovered that alkylamines can be reacted with sulfur dichloride in the presence of a polar solvent which contains ether linkages to form a stable high molecular weight polymer. The polymer formed by the reaction of alkylamines and sulfur dichloride in the presence of a polar solvent containing ether linkages is a stable material which is insoluble in common solvents except carbon disulfide. It has been found that the polymer can be stored at room temperature without visible decomposition for periods greater than six months. The stability of this polymer product is quite unexpected since the prior art as above noted clearly indicates that sulfur-nitrogen polymeric materials are relatively unstable, decomposing over a period of several weeks at room temperature.

DETAILED DESCRIPTION OF THE INVENTION

In the practice of the present invention, a reaction vessel equipped with a cooling jacket is charged with an alkylamine dispersed or dissolved in a polar solvent containing ether linkages. The temperature of the alkylamine-polar solvent mixture is reduced to the reaction temperature and at least a stoichiometric amount of sulfur dichloride is slowly added to the alkylamine while the solution is vigorously agitated or stirred. An insoluble polymeric material consisting of polyalkylamine monosulfide is formed and can be removed by filtration. As is well understood in this art, hydrogen chloride is evolved and a conventional scavenger can be added as a hydrogen chloride acceptor, or sufficient alkylamine can be added to scavenge the hydrogen chloride which is formed.

The alkylamines which are useful and preferred in the practice of the present invention are methylamine, ethylamine and mixtures thereof.

The process of the present invention is conducted in the presence of a polar solvent which contains ether linkages. Suitable solvents are liquids at the temperature of the reaction and are non-reactive with the reactants in the system. The term "polar solvents" which contain ether linkages is used to denote the non-reactive materials which are liquids at the reaction temperature and contain at least one

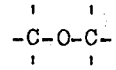

linkage such as the dialkyl ethers, dimethyl ether, methyl ethyl ether, diethyl ether, ethyl propyl ether, dipropyl ether, diisopropyl ether, methyl propyl ether, methyl butyl ether, ethyl butyl ether, propyl butyl ether, dibutyl ether and the like; glymes such as ethylene glycol, dimethyl ether, ethylene glycol diethyl ether, ethylene glycol dipropyl ether, dimethoxymethane and the like; cyclic ethers such as tetrahydrofuran and the like; aromatic ethers such as anisole and the like and aliphatic ethers such as methyl cyclohexyl ether and the like. It is preferred however that the polar solvent containing ether linkages be diethyl ether, 1,2-dimethoxyethane, tetrahydrofuran or mixtures thereof.

The use of a polar solvent containing ether linkages as the reaction medium has unexpectedly been discovered to provide a polymeric material having stability and solubility properties heretofore not described in the art. The novel process produces novel materials which are an advance in the art.

The polymer can be prepared by the process of the present invention over a wide temperature range such as from about −100° C. to about 80° C., but it is preferred to prepare the polymer between about −75° C. and about 25° C.

The polymeric products formed by the above process, are materials stable at room temperature over long periods of time. The polymeric products of the present invention have been stored at room temperature for periods as long as six months without visible decomposition.

The polymeric products prepared by the practice of the present invention have been found to be insoluble at room temperature in solvents such as chloroform, carbon tetrachloride, acetonitrile, ethanol, methanol, ethyl ether, tetrahydrofuran, dimethylsulfoxide, hexane, pentane, N,N-dimethyl formamide and the like. The polymeric products are soluble in carbon disulfide.

The polymeric products are useful as rubber vulcanizers, accelerators for curing systems, adhesives, packing, caulking materials, pigments, fillers, molding powders and binders.

The invention is illustrated by the following examples:

EXAMPLE 1

A stable polymeric material was formed by adding 226 grams (2.19 moles) of freshly distilled sulfur dichloride dropwise over a period of 2.5 hours to a solution of 204 grams (6.57 moles) methylamine in 1.5 liters of diethyl ether, a polar solvent, at −50° C. The resulting mixture was allowed to stir overnight at room temperature. Then, 15 grams of sulfur dichloride were added at room temperature to ensure complete reaction of all the free amine. The ether insoluble materials were filtered and washed several times with water to remove any remaining amine hydrochloride. The resulting yellow solid was dried under reduced pressure to give 86.9 grams of a stable polymeric material. The analysis of the product calculated for $CH_3NS$ was C = 20.68%; H = 5.52%; S = 49.70%; N = 24.10%. The analysis of the product found on the same basis was C = 21.5%; H = 3.97%; N = 23.70%; S = 50.75%.

The yellow solid was not soluble in chloroform, carbon tetrachloride, acetonitrile, tetrahydrofuran, ethyl ether, dimethylsulfoxide, methanol, ethanol, N,N-dimethyl formamide, hexane or pentane. The solid polymer was soluble in carbon disulfide. The yellow solid was held for six months at room temperature in a covered jar without visible decomposition.

EXAMPLE 2

A polymeric material was formed by dissolving 84.3 grams (1.87 moles) of ethylamine in 1,000 ml. of diethyl ether and the solution was cooled to −75° C. Then, 64 grams (0.62 moles) of sulfur dichloride were added dropwise over a period of one hour, while keeping the reaction temperature below −50° C. The product was treated in a manner as set forth in Example 1. A brownish polymer was formed and was stable at room temperature. The analysis of the product calculated for $C_2H_5NS$ was C = 25.2%; H = 5.28%; N = 14.75%; S = 54.7%. The analysis of the product actually found on the same basis was C = 25.75%; H = 4.87%; N = 13.74%; and S = 55.30%.

The polymer was not soluble in chloroform, carbon tetrachloride, tetrahydrofuran, acetonitrile, ethanol, methanol, ethyl ether, dimethylsulfoxide, N,N-dimethyl formamide, hexane or pentane. The polymer was soluble in carbon disulfide. The polymer was stored in a covered jar at room temperature for six months without visible decomposition.

EXAMPLE 3

A polymeric material was formed by first adding 3 moles of monomethylamine to 1 liter of petroleum ether, a non-polar solvent. Then, one mole of sulfur dichloride was added thereto at below −50° C. and allowed to stand overnight at room temperature. The ether insoluble solid was removed and washed with water to give a small amount of a rubbery material. Removal of the volatile components from the ether layer offered 52 grams of an oil which on standing two days at room temperature decomposed violently.

The above examples show that the polymeric products of the present invention are stable over long periods of time and are not soluble in most common solvents. The following examples show that the stable polymeric products of the present invention improve curing properties when incorporated into rubber master batches.

EXAMPLE 4

The polymeric compositions of Examples 1 and 2 were tested for use as a vulcanizing accelerator in a commercial ethylene propylene diene modified rubber. Thus, a master batch was premixed in a commercial mixer, using the following composition expressed in parts by weight:

| | |
|---|---|
| EPDM | 100 |
| Carbon black | 150 |
| Naphthenic process oil | 70 |
| Stearic acid | 1 |

Thereafter, the following compounding ingredients were added on a laboratory mill at 120° F. in three different batches as follows:

| | A | B | C |
|---|---|---|---|
| Zinc oxide | 5.0 | 5.0 | 5.0 |
| 2-mercaptobenzothiazole | 0.5 | 0.5 | 0.5 |
| Tetramethylthiuram disulfide | 1.5 | 1.5 | 1.5 |
| Sulfur | 1.5 | — | — |
| Polymeric Methylamine of Example 1 | — | 2.5 | — |
| Polymeric Ethylamine of Example 2 | — | — | 2.5 |
| The test results are as follows: | A | B | C |
| Scorch at 270° F. (Rotating-disc Viscometer) minutes | 11.0 | 6.7 | 5.0 |
| Minimum Viscosity (Oscillating-disc Rheograph) inch-pounds/minute | 28.8 | 31.8 | 33.9 |
| Maximum Viscosity (Oscillating-disc Rheograph) inch-pounds/minute Test temperature 320°F. at 900 cpm. | 92.0 | 74.3 | 61.0 |

|  | A | B | C | D |
|---|---|---|---|---|
| N-Cyclohexyl-2-benzothiazole sulfenamido | 0.65 | 0.65 | — | 0.65 |
| Sulfur | 2.25 | — | — | — |
| Polymeric methylamine of Example 1 | — | 3.50 | 4.00 | — |
| Polymeric ethylamine of Example 2 | — | — | — | 4.00 |

The test results are as follows:

|  | A | B | C | D |
|---|---|---|---|---|
| Scorch at −270° F. (Rotating - disc Viscometer) minutes | 15.4 | 7.4 | 6.4 | 2.6 |
| Minimum Viscosity −320° F. (oscillating-disc Rheograph) inch-pounds/minute | 22.2 | 23.8 | 24.8 | 24.9 |
| Maximum Viscosity −320° F. (oscillating-disc Rheograph) inch-pounds/minute Speed 900 cpm. | 60.8 | 66.3 | 62.1 | 52.0 |

EXAMPLE 5

The polymeric material of Example 1 and 2 were tested for use as a vulcanizing accelerator in natural rubber. Thus, a master batch was premixed in a commercial mixer having the following composition expressed in parts by weight:

| Natural Rubber | 100 |
|---|---|
| Carbon Black | 40 |
| Zinc Oxide | 4 |
| Stearic Acid | 2 |
| Amine Antioxidant | 1 |

The following compounding ingredients were added on a laboratory mill at 220° F:

What is claimed is:

1. The process of producing a polymeric material which comprises; forming a mixture of ethylamine and a polar solvent, containing ether linkages, adding thereto at least a stoichiometric amount of sulfur dichloride at a temperature of from about −100°C. to 80°C., and isolating the resultant polymeric material.

2. The process of claim 1 wherein the polar solvent containing ether linkages is selected from the group consisting of diethyl ether, 1,2-dimethoxyethane, tetrahydrofuran and mixtures thereof.

3. The process of claim 1 wherein the solvent is diethylether.

4. The solid polymeric product of the process of claim 1.

5. The process of claim 1 wherein the sulfur dichloride is added to the solvent-amine mixture between about −75° C. and about 25° C.

* * * * *